E. D. DUNNING.
LAMP FOR AUTOMOBILES OR OTHER VEHICLES.
APPLICATION FILED NOV. 23, 1909.
982,803.
Patented Jan. 31, 1911.
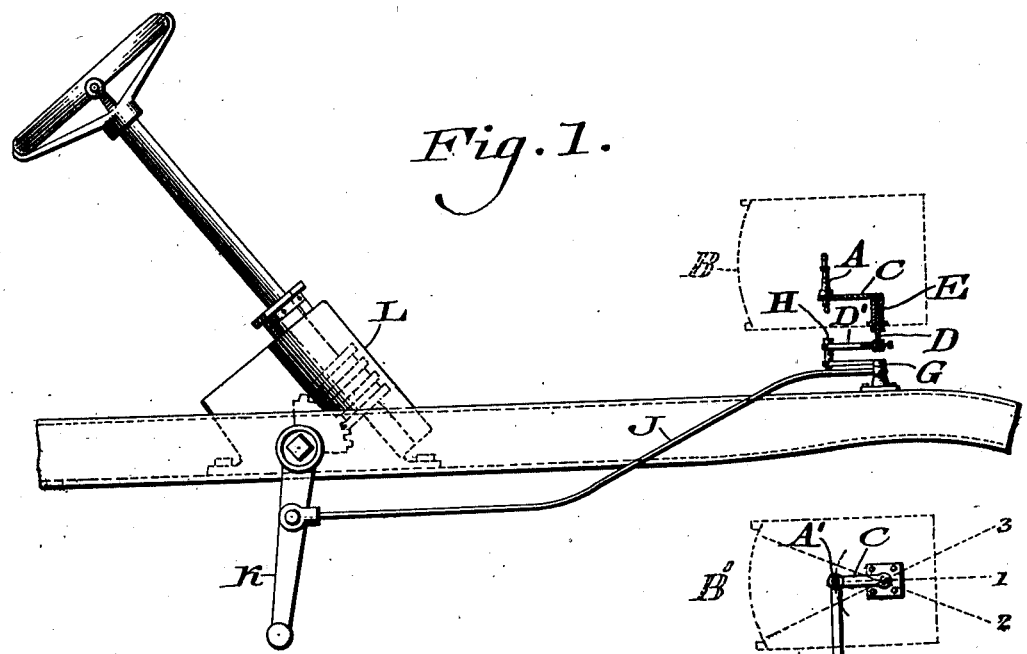
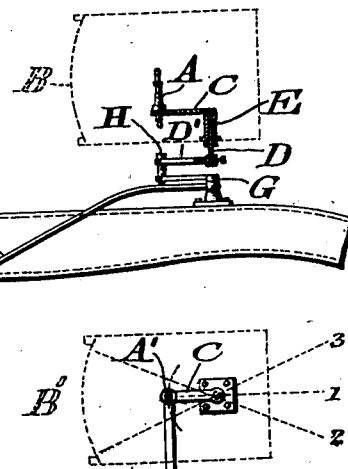
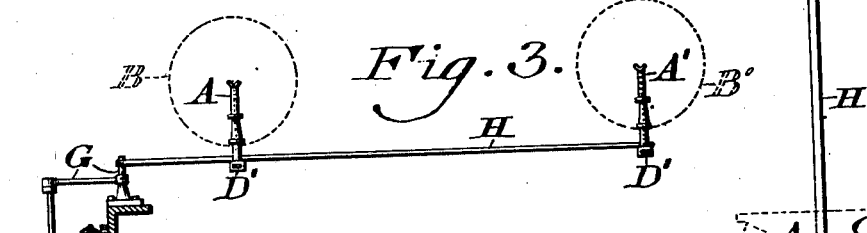
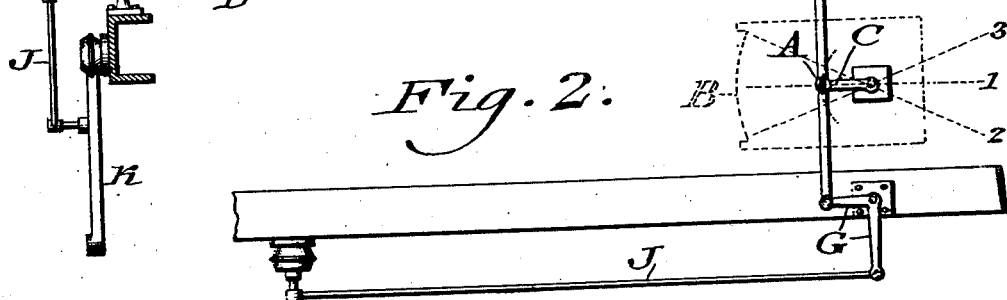
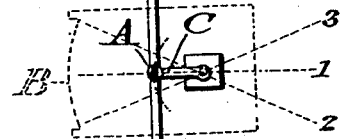
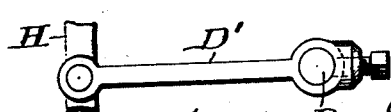
WITNESSES
INVENTOR
Elmer D. Dunning
BY
ATTORNEYS

UNITED STATES PATENT OFFICE.

ELMER D. DUNNING, OF PHILADELPHIA, PENNSYLVANIA.

LAMP FOR AUTOMOBILES OR OTHER VEHICLES.

982,803.

Specification of Letters Patent.  Patented Jan. 31, 1911.

Application filed November 23, 1909. Serial No. 529,523.

*To all whom it may concern:*

Be it known that I, ELMER D. DUNNING, a citizen of the United States, residing in the city and county of Philadelphia, State of Pennsylvania, have invented a new and useful Lamp for Automobiles or other Vehicles, of which the following is a specification.

My invention consists of a lamp for an automobile or other vehicle, provided with a burner which is movably mounted, so that the light thereof may be deflected with the changes of direction of the vehicle, more particularly around corners and on curves.

It consists also in adapting said burner to be moved by the steering mechanism of the vehicle.

For the purpose of explaining the invention, the accompanying drawing illustrates a satisfactory reduction of the same to practice, but the important instrumentalities thereof may be varied, and so it is to be understood that the invention is not limited to the specific arrangement and organization shown and described.

Figure 1 represents a side elevation of a lamp of an automobile or other vehicle embodying my invention. Fig. 2 represents a top or plan view thereof. Fig. 3 represents a front view thereof. Fig. 4 represents a bottom plan view of a detached portion.

Similar letters of reference indicate corresponding parts in the figures.

Referring to the drawings:—A designates the burner of an automobile lamp B, the same being connected with the radial arm or horizontal limb C of an elbow whose vertical limb D comprising an axle is journaled in the boss E, which is fitted to the base of said lamp, said burner occupying a position in front of the reflector, and the lamp being supported in any suitable manner usual in such cases, so as to be comparatively stationary, said reflector being curved or concave, as well known. The arm or limb C acts as a crank for turning the burner in a path concentric with the front of the reflector.

On the lower end of the limb D is a radial arm D', to which is attached the cross bar H, the latter joining a radial arm similar to D' on the carrier of a burner A' of an opposite lamp B', thus coupling the burners of a pair of lamps on the vehicle. One end of the cross bar H is pivotally attached to the bell crank lever G, which is suitably mounted on the vehicle and has pivotally connected with it the rod J which extends to the hanger or arm K, with which it is pivotally connected, said arm K being mounted on the frame of the vehicle and adapted to be geared with and operated by the steering device L.

The operation is as follows:—As the vehicle proceeds straight to the front, the light of the burners will be correspondingly reflected, as indicated by the arrow 1. If the vehicle is directed to the right, the burners will be correspondingly turned by the steering device and connected mechanism, thus reflecting the light in the direction indicated by the arrows 2. If the vehicle is directed to the left, the burners will be correspondingly turned by the steering device and connected mechanism, thus reflecting the light in the direction indicated by the arrows 3. By these means, the streets or roads will be illuminated in all directions of the vehicle, a feature of importance when the vehicle changes its direction, especially in turning corners and curves, thus properly illuminating the path of the vehicle ahead, whether straight in front or the change of direction.

It will be observed that neither the lamp nor the reflector therein change their positions during the change of direction of the reflected light of the burner.

Having thus described my invention, what I claim as new and desire to secure by Letters Patent, is:—

1. In a vehicle lamp of the character stated, a stationarily mounted reflector, a burner in front of the same, a carrier for said burner adapted to move the latter across said reflector, and a connection for said carrier with a member of the steering gear of the vehicle adapted to cause the movement of the said burner in the manner stated.

2. In a vehicle lamp of the character stated, a stationarily mounted curved reflector, a burner in front of the same, a carrier for said burner adapted to move the latter in a path concentric with the curvature of said reflector, and means connected with said carrier and a member of the steering gear of the vehicle adapted to operate said burner in its movements.

3. In a vehicle lamp of the character stated, a stationarily mounted curved reflector, a burner in front of the same, a crank-like arm carrying said burner adapted to turn the latter in a path concentric with the curvature of said reflector, a member of the steering mechanism of the vehicle, and means for connecting said arm with said member.

4. In a vehicle lamp of the character stated, a fixed curved reflector, a radial arm mounted on a vertical axle to turn to the right or left, a burner carried by said arm to move in a path concentric with the curvature of said reflector, an arm depending from the frame of the vehicle, and a connection between said arm and axle.

5. In a vehicle lamp of the character stated, a burner, a radial arm carrying the same, an axle for said arm, a bearing for said axle, a lever connected with said axle, and operating means for said lever extending from the same to the steering device of the vehicle with which it is connected and by which it is actuated so as to change the line of reflection of the light of the burner to the right or left with the change of direction of the vehicle.

ELMER D. DUNNING.

Witnesses:
JOHN A. WIEDERSHEIM,
HARRY C. DALTON.